United States Patent [19]
Goto

[11] Patent Number: 5,892,640
[45] Date of Patent: Apr. 6, 1999

[54] MAGNETIC HEAD DEVICE

[75] Inventor: Shigenobu Goto, Miyagi, Japan

[73] Assignee: Sony Corporation, Tokyo, Japan

[21] Appl. No.: 887,703

[22] Filed: Jul. 3, 1997

[30] Foreign Application Priority Data

Jul. 4, 1996  [JP]  Japan .................................. 8-174917

[51] Int. Cl.[6] .................................................. G11B 5/592
[52] U.S. Cl. .......................................................... 360/109
[58] Field of Search .............................. 360/109, 77.16, 360/77.17

[56] References Cited

U.S. PATENT DOCUMENTS 5,408,376  4/1995  Nishikura et al. ...................... 360/109

Primary Examiner—Robert S. Tupper
Attorney, Agent, or Firm—Hill & Simpson

[57] ABSTRACT

A magnetic head device including a first supporting member having resilience; a second supporting member formed by an electromechanical conversion element; and a parallel leaf spring member having parallel leaf springs that are joined to ends of the first supporting member and the second supporting member, respectively, and having a head tip mounted to its base; wherein the second supporting member performs electromechanical conversion and moves with an amplitude along with the first supporting member in order to displace and drive the head tip in a predetermined direction; and wherein the leaf spring of the parallel leaf spring member, which is adjacent to the second supporting member, has a recess formed in an end thereof in order to receive an end of the second supporting member.

2 Claims, 4 Drawing Sheets

MAGNETIC HEAD DEVICE

BACKGROUND OF THE INVENTION

1. Field of the Invention

The present invention broadly relates to a magnetic head device mounted to a rotary drum of a video tape recorder (VTR) capable of variable speed reproduction, and, more particularly, to a magnetic head device whose head tip is displaced and driven in a predetermined direction by using an electromechanical converting element (bimorph plate).

2. Description of the Related Art

A so-called DT (dynamic tracking) head that tracks recording tracks during reproduction at variable speed has been used as a magnetic head device which is mounted to a rotary drum of a conventional video tape recorder (VTR).

FIG. 4 is a view showing a conventional magnetic head device using the above-described DT head.

In the magnetic head device, a parallel leaf spring member 8 and a head tip 9 are supported by two supporting members, that is by a dummy base 10 and a bimorph plate 6. A flexible base 12 is affixed on top of the dummy base 10 by a screw 4.

As shown in FIG. 4A, the bimorph plate 6 is formed from a trapezoidal sheet, and, as shown in FIG. 4B, it is sandwiched and held by a fixed portion 11 and a fixed plate 7, with an end side being a free end that is joined to a bottom leaf spring 8b of the parallel leaf spring member 8. The dummy base 10 is formed from a rectangular sheet. Its base end portion is integrally formed with the fixed portion 11 fixed at a location corresponding to the location of the fixed plate 7. An end of the dummy base 10 is a free end that is joined to an upper leaf spring 8a of the parallel leaf spring member 8.

The bimorph plate 6 is adhered to a pair of piezoelectric ceramic plates through a reinforcer using an epoxy type adhesive. The piezoelectric ceramic plates (made of lead zirconate, lead titanate, or the like) are formed from sintered ceramic powder. Electrode layers, such as those formed by a silver-baked paint electrode, are formed on each of the surfaces thereof. The magnetic head device is provided with a drive circuit (not shown) in order to apply a voltage V to such a bimorph plate 6 through the electrode layers described above.

The dummy base 10 is made of carbon-type material (carbon fiber type material) and has a resilience that allows it to deform sufficiently in accordance with the movement of the bimorph plate 6.

In such a construction, applying a voltage to the bimorph plate 6 from the electrode layers causes one of the piezoelectric plates adhered to the bimorph plate 6 to expand (or contract) and the other piezoelectric plate to contract (or expand).

This causes the bimorph plate 6 to bend as a whole. Here, the dummy base 10, which is connected to the bimorph plate 6 through the parallel plate spring member 8, bends in accordance with the bending of the bimorph plate 6. Thus, while being supported by the two supporting members (the bimorph plate 6 and the dummy base 10), the head tip 9 can be displaced in the direction of arrow a or in a direction opposite thereto by merely driving only one bimorph plate 6.

The amplitude of the displacement in the forward or reverse direction is approximately 600 µm. Displacing the head tip 9 in this way allows reproducing operations, from reverse reproduction to a reproduction performed three times faster, without any noise.

When the head tip 9 is displaced in the forward or reverse direction so as to move with an amplitude, the parallel plate spring member 8 acts to improve the contact between the head tip 9 and the tape. Like the dummy base 10, the parallel leaf spring member 8 is made of carbon-type material (carbon fiber).

In FIG. 4A, reference numeral 13 denotes wirings, and reference numerals 14 and 15 denote lands to which the wirings 13 are connected.

However, in such a conventional magnetic head device, the dummy base 10 is adhered to the upper leaf spring 8a of the parallel leaf spring member 8, as shown in FIG. 5C, after only part of the lower leaf spring 8b of the parallel leaf spring member 8 and part of the bimorph plate 6 are placed upon each other, as shown in FIG. 5A, and adhered together from the front and back sides of the lower leaf spring 8b and the bimorph plate 6, using epoxy resin p, as shown in FIG. 5B. Thus, the conventional magnetic head device has the following problems:

(a) It is necessary to apply a large amount of epoxy resin p in order to adhere the lower leaf spring 8b of the parallel leaf spring member 8 and the bimorph plate 6 together with a predetermined adhesive strength, thereby increasing the number of manhours.

(b) Since the lower leaf spring 8b of the parallel leaf spring member 8 and the bimorph plate 6 are adhered together merely by placing them on top of each other, the state of adhesion between the spring 8b and the bimorph plate 6 becomes unstable, with variations in the adhesive strength, which causes variations in the displacement amplitude of the head tip 9.

(c) In addition, since the lower leaf spring 8b of the parallel leaf spring member 8 and the bimorph plate 6 are adhered together merely by placing them on top of each other, variations occur in the posture of the parallel leaf spring member 8 adhered to the bimorph plate 6. This causes the head tip 9 disposed at the parallel leaf spring member 8 to tilt, since it cannot assume a most suitable posture, so that the angle of a gap formed at the head tip 9 no longer matches the angle of the tape recording lines. This results in poorer reproduction output characteristics (or electromagnetic conversion characteristics), since the angle of the gap is set less accurately with respect to the required azimuth.

SUMMARY OF THE INVENTION

Accordingly, it is an object of the present invention to provide a magnetic head device whose leaf spring member can be adhered to the bimorph plate with a predetermined adhesive strength, using a relatively small amount of epoxy resin, and which can prevent tilting of the head tip to prevent deterioration in the reproduction output characteristics.

To this end, according to the present invention, there is provided a magnetic head device comprising: a first supporting member having resilience; a second supporting member formed by an electromechanical conversion element; and a parallel leaf spring member having parallel leaf springs that are joined to ends of the first supporting member and the second supporting member, respectively, and having a head tip mounted to its base; wherein the second supporting member performs electromechanical conversion and moves with an amplitude along with the first supporting member in order to displace and drive the head tip in a predetermined direction; and wherein the leaf spring of the parallel leaf spring member, which is adjacent to the second supporting member, has a recess formed in an end thereof in order to receive an end of the second supporting member.

The magnetic head device with such a construction allows the leaf spring member to be adhered to the bimorph plate with a predetermined adhesive strength, using a relatively small amount of epoxy resin, since a recess for receiving an end of a second supporting member is formed in an end of a leaf spring of the parallel leaf spring member, which is adjacent to the second supporting member. In addition, by virtue of such a construction, it is possible to prevent deterioration of the reproduction output characteristics by preventing tilting of the head tip.

DESCRIPTION OF THE PREFERRED EMBODIMENTS

Figure 1A:
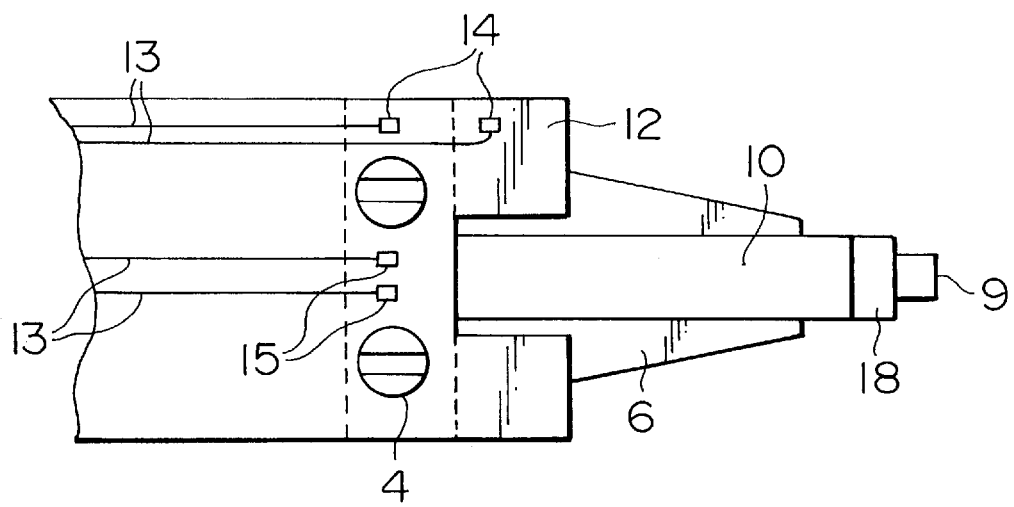
FIG. 1A is a plan view of a magnetic head device of Embodiment 1 in accordance with the present invention.

A description will now be given of the preferred embodiments of the present invention, with reference to the drawings.

FIGS. 1 and 2 are views showing a magnetic head device of Embodiment 1 in accordance with the present invention.

FIG. 1 is a view showing the structure of the main portion of the magnetic head device.

In the magnetic head device, a parallel leaf spring member 18 and a head tip 9 are supported by two supporting members, that is by a dummy base (first supporting member) 10 and a bimorph plate (second supporting member) 6. A flexible base 12 is affixed on top of the dummy base 10 by a screw 4.

Figure 1B:
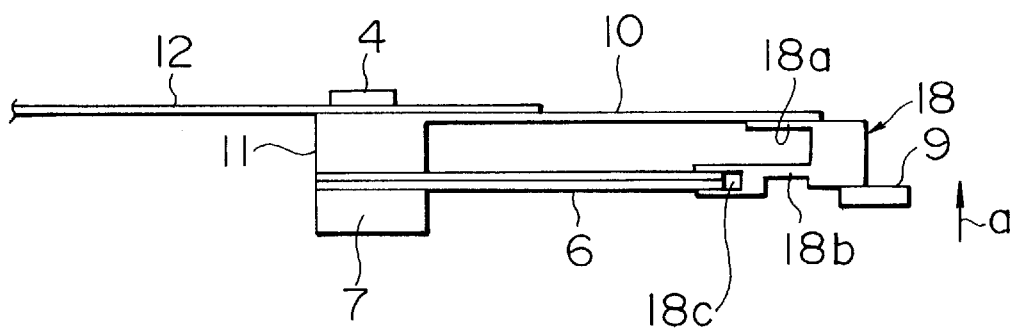
FIG. 1B is a side elevational view of the magnetic head device of Embodiment 1 in accordance with the present invention.

As shown in FIG. 1A, the bimorph plate 6 is formed from a trapezoidal sheet, and, as shown in FIG. 1B, it is sandwiched and held by a fixed portion 11 and a fixed plate 7, with an end side being a free end that is joined to a bottom leaf spring 18b of the parallel leaf spring member 18. The dummy base 10 is formed from a rectangular sheet. Its base end side is integrally formed with the fixed portion 11 fixed at a location corresponding to the location of the fixed plate 7. An end of the dummy base 10 is a free end that is joined to an upper leaf spring 18a of the parallel leaf spring member 18.

The bimorph plate 6 is adhered to a pair of piezoelectric ceramic plates through a reinforcer using an epoxy adhesive. The piezoelectric ceramic plates (made of lead zirconate, lead titanate, or the like) are formed from sintered ceramic powder. Electrode layers, such as those formed by a silver-baked paint electrode, are formed on each of the surfaces thereof.

The magnetic head device is provided with a drive circuit (not shown) in order to apply a voltage V to such a bimorph plate 6 through the electrode layers described above. The dummy base 10 is made of carbon-type material (carbon fiber type material) and has a resilience that allows it to deform sufficiently in accordance with the movement of the bimorph plate 6.

In such a construction, applying a voltage to the bimorph plate 6 from the electrode layers causes one of the piezoelectric plates adhered to the bimorph plate 6 to expand (or contract) and the other piezoelectric plate to contract (or expand).

This causes the bimorph plate 6 to bend as a whole. Here, the dummy base 10, which is connected to the bimorph plate 6 through the parallel plate spring member 18, bends in accordance with the bending of the bimorph plate 6. Thus, while being supported by the two supporting members (the bimorph plate 6 and the dummy base 10), the head tip 6 can be displaced in the direction of arrow a or in a direction opposite thereto by merely driving only one bimorph plate 6.

The amplitude of the displacement in the forward or reverse direction is approximately 600 $\mu$m. Displacing the head tip 6 in this way allows reproducing operations, from reverse reproduction to a reproduction performed three times faster, without any noise.

When the head tip 9 is displaced in the forward or reverse direction so as to move with an amplitude, the parallel plate spring member 18 acts to improve the contact between the head tip 9 and the magnetic tape. Unlike the dummy base 10 and the fixed portion 11 that are made of carbon materials, the parallel plate spring member 18 is composed of insulating materials, such as ceramics, MC nylon, plastics including Derlin and Teflon, or Bakelite.

In FIG. 1A, reference numeral 13 denotes wirings, and reference numerals 14 and 15 denote lands to which the wirings 13 are connected.

Figure 2A:
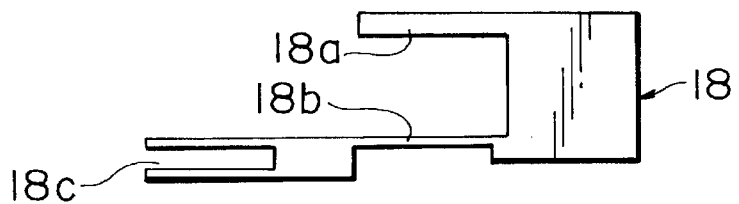
FIG. 2A is a side elevational view of the parallel leaf spring 18 of FIG. 1.
Figure 2B:
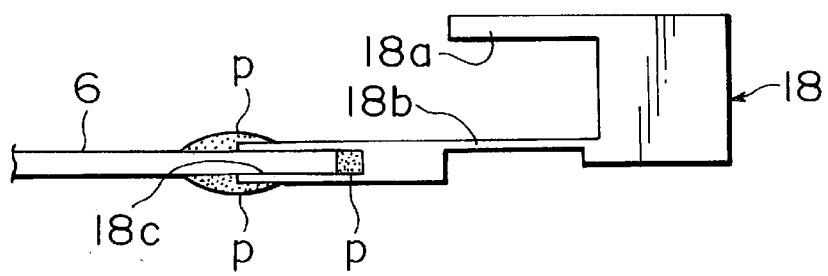
FIG. 2B is a view showing a condition in which the parallel leaf spring member 18 is adhered to the bimorph 6.

As shown in FIG. 2A, the parallel plate spring member 18 has an upper leaf spring 18a and a lower leaf spring 18b, which are parallel to each other. The upper leaf spring 18a is adhered to the dummy base 10, while the lower leaf spring 18b is adhered to the bimorph plate 6. A recess 18c is formed in an end of the lower leaf spring 18 in order to receive an end of the bimorph 6 which is adhered thereto with epoxy resin p, as shown in FIG. 2B.

In the construction of the magnetic head device of the present embodiment, an end of the bimorph plate 6 is inserted into an end of the lower leaf spring 18b of the parallel plate spring member 18, which is formed adjacent to the bimorph plate 6. Therefore, the bimorph plate 6 can be adhered to the lower leaf spring 18b with a predetermined strength, with a relatively small amount of epoxy resin p. In addition, in such a construction, the gap at the head tip 9, which is prevented from tilting, can be set precisely at the correct azimuth, thereby preventing deterioration of the reproduction output characteristics.

Figure 3A:
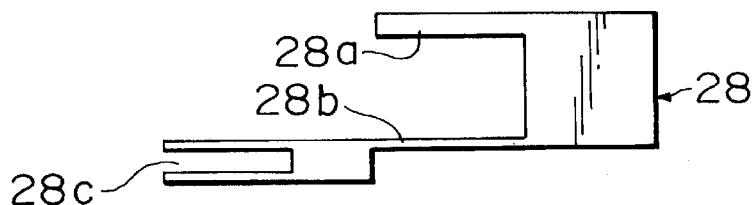
FIG. 3A is a side elevational view of a parallel leaf spring member 28 in Embodiment 2 in accordance with the present invention.
Figure 3B:
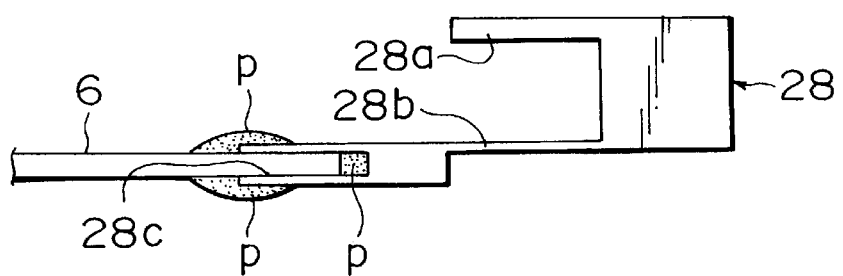
FIG. 3B is a view showing a condition in which the parallel leaf spring member 28 is adhered to the bimorph 6.
Figure 4A:
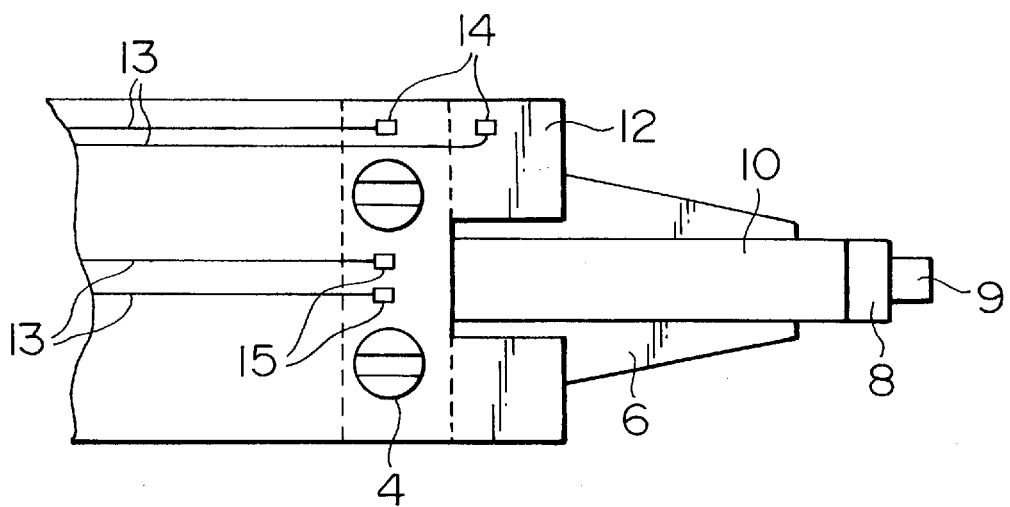
FIG. 4A is a plan view of a conventional magnetic head device.
Figure 4B:
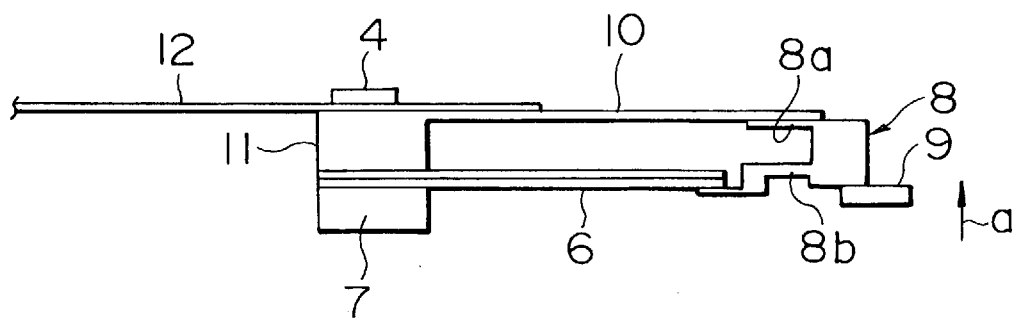
FIG. 4B is a side elevational view of the conventional magnetic head device.
Figure 5A:
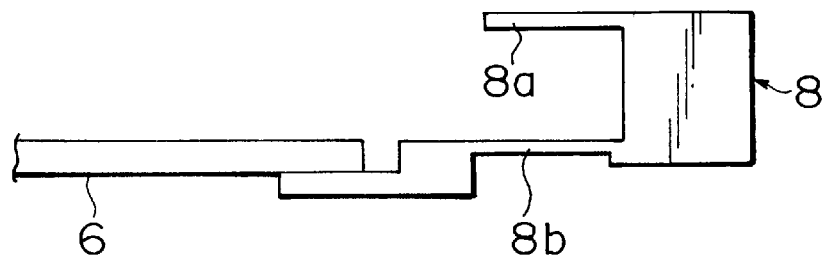
FIGS. 5A, 5B, and 5C are views showing the order in which the parallel leaf spring member 8, the bimorph 6, and the dummy base 10 are assembled together, with the assembly proceeding from FIGS. 5A to 5B to 5C.
Figure 5B:
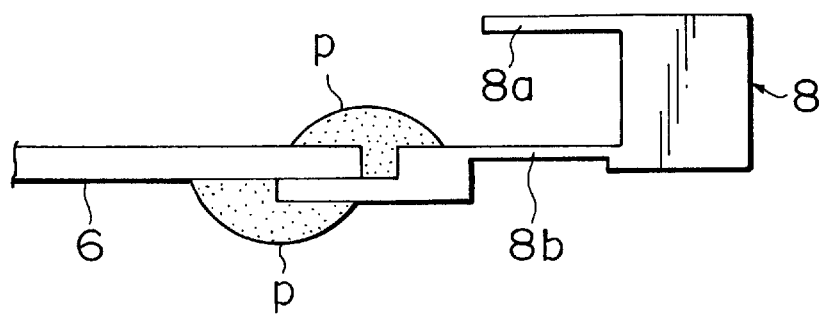
Figure 5C:
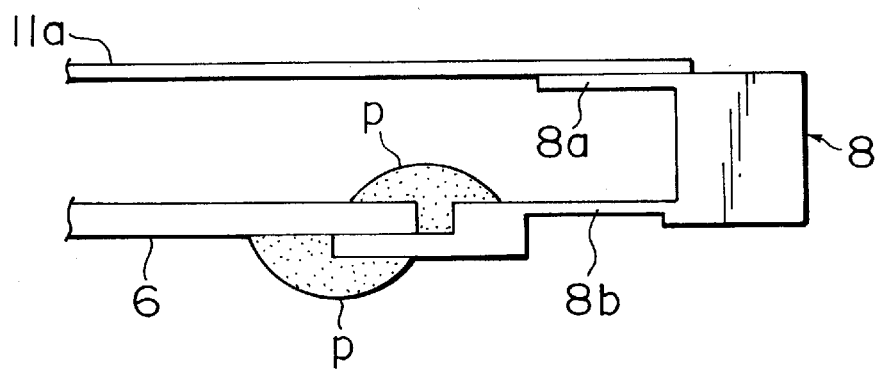

FIGS. 3A and 3B are views showing a second embodiment of the present invention. The second embodiment differs from the first embodiment only in the location from where the base of the lower leaf spring extends from the parallel leaf spring member 18. In the first embodiment, the base of the lower leaf spring 18b of the parallel leaf spring 18 extends toward the left in FIG. 3 from a location slightly above the bottom surface of the parallel leaf spring member 18, while in the second embodiment the lower leaf spring 28b extends leftwards in FIG. 3 from the bottom surface of the parallel leaf spring member 28.

According to the second embodiment, the parallel leaf spring members can be formed in accordance with changes in the thickness of the fixed portion 11, and the shape of the parallel leaf spring 28 can be made simpler, thus making it possible to reduce production costs. The upper leaf spring 28a in the second embodiment does not differ from that in the first embodiment.

As can be understood from the foregoing description, according to the present invention, a recess for receiving an end of the second supporting member is formed in an end of a leaf spring of the parallel leaf spring member, which is located adjacent the second supporting member, thus allowing the second supporting member to be adhered to the leaf spring with a predetermined strength, with a relatively small amount of epoxy resin. In addition, in the construction, the head tip is prevented from tilting, thereby preventing deterioration of the reproduction output characteristics.

According to the second embodiment, it is possible to form the parallel leaf spring members with changes in the thickness of the fixed portion 11 and to reduce production costs due to a simpler shape of the parallel leaf spring member 28.

Increasing the insulating effects by using insulating materials, such as ceramics, MC nylon, plastics including Derlin and Teflon, or Bakelite for the parallel leaf spring members 18 and 28 obviates such problems as current leakage, short circuits, etc.

What is claimed is:

1. A magnetic head device, comprising:

a flexible base, a first supporting member having resilience which extends from said base a first distance;

a second supporting member formed by an electromechanical conversion element which also extends from said flexible base, but which extends from said flexible base a distance which is less than said first distance; and a parallel leaf spring member having a base and parallel first and second leaf springs extending from the base and which are secured to ends of said first supporting member and said second supporting member, respectively, and having a head tip mounted to the base;

wherein said second supporting member performs electromechanical conversion and moves with an amplitude along with said first supporting member in order to displace and drive the head tip in a predetermined direction;

wherein the second leaf spring of said parallel leaf spring member, which is secured to said second supporting member, has an extension with a recess formed in an end thereof in order to receive an end of said second supporting member between two parallel surfaces a distance which is less than said first distance; and wherein said second leaf spring extension is horizontally displaced from an end of said first leaf spring so that said first and second supporting members are secured to said parallel leaf spring member at horizontally displaced positions.

2. A magnetic head device according to claim 1, wherein said parallel leaf spring member is formed from an insulating material.

* * * * *